(12) United States Patent
Woosley et al.

(10) Patent No.: US 8,244,725 B2
(45) Date of Patent: Aug. 14, 2012

(54) METHOD AND APPARATUS FOR IMPROVED RELEVANCE OF SEARCH RESULTS

(75) Inventors: David Woosley, Greenwood, AR (US); Michael Every, Pottstown, PA (US)

(73) Assignee: Iron Mountain Incorporated, Boston, MA (US)

( * ) Notice: Subject to any disclaimer, the term of this patent is extended or adjusted under 35 U.S.C. 154(b) by 2136 days.

(21) Appl. No.: 10/863,543

(22) Filed: Jun. 7, 2004

(65) Prior Publication Data

US 2005/0203888 A1    Sep. 15, 2005

Related U.S. Application Data

(60) Provisional application No. 60/551,898, filed on Mar. 10, 2004.

(51) Int. Cl.
G06F 17/20 (2006.01)
G06F 15/16 (2006.01)
(52) U.S. Cl. ......................................... 707/732; 707/749
(58) Field of Classification Search .................... None
See application file for complete search history.

(56) References Cited

U.S. PATENT DOCUMENTS

| | | | |
|---|---|---|---|
| 2003/0014399 A1* | 1/2003 | Hansen et al. | 707/3 |
| 2003/0195873 A1* | 10/2003 | Lewak et al. | 707/3 |
| 2004/0054661 A1* | 3/2004 | Cheung et al. | 707/3 |
| 2004/0243588 A1* | 12/2004 | Tanner et al. | 707/100 |

* cited by examiner

*Primary Examiner* — John E Breene
*Assistant Examiner* — Alex Gofman
(74) *Attorney, Agent, or Firm* — Wolf, Greenfield & Sacks, P.C.

(57) ABSTRACT

A method and system for information retrieval are provided whereby at least one search criterion is received from a user; a query is created based on the at least one search criterion; the query is executed to generate results, each of the results corresponding to a respective data entity which satisfies the at least one search criterion; the results are arranged into an order, the order being determined at least in part by a characteristic of the data entity corresponding to each result and a previous act by a user with respect to the data entity corresponding to each result; and the results are displayed to the user.

37 Claims, 14 Drawing Sheets

FIG. 8D

METHOD AND APPARATUS FOR IMPROVED RELEVANCE OF SEARCH RESULTS

RELATED APPLICATIONS

This application claims priority under 35 U.S.C. §119(e) to U.S. Provisional Application Ser. No. 60/551,898, entitled "METHOD AND APPARATUS FOR IMPROVED RELEVANCE OF SEARCH RESULTS," filed on Mar. 10, 2004, which is herein incorporated by reference in its entirety.

FIELD OF INVENTION

The present invention relates to retrieval of information records from data stores, and more particularly to presentation of retrieved records in a manner that facilitates identification of a record or records of interest.

BACKGROUND OF INVENTION

A vast amount of information is created daily and stored in digital form. Because the cost of storing information in digital form has dropped precipitously in recent years, little incentive often exists to destroy "old" information as "new" information is stored. As a result, the total amount of information stored in digital form has grown, and continues to grow, very quickly.

One effect of this "information explosion" is illustrated by the Internet and World Wide Web ("Web"). In particular, while an extremely large amount of information has become available via the Web (some estimates indicate that it comprises tens of billions of Web pages), specific information can be very difficult to locate. That is, it can be challenging for users to identify and retrieve, from among the vast amount of available information, the specific information that meets their needs.

One tool that has been developed to help users locate specific information is the search engine. A search engine, when deployed on the Web, typically utilizes "web crawlers" to collect new or updated content from Web sites on a periodic basis, summarizes that content, and stores the summary information in an indexed database. A user may employ the search engine by providing criteria in the form of one or more keywords or phrases, which are used as the basis for a query that executes against the database. The results of the query are typically presented to the user in the form of hyperlinks to the actual Web pages found by a web crawler.

The amount of information stored in many on-line "private" data collections (i.e., those accessed only by specific individuals, such as a business's database that is accessed by employees) has also grown tremendously, leading many organizations that maintain them to make search engines available to the collections' users. In particular, many organizations maintain a private collection of data relating to offline endeavors, and make a search engine available so that employees may quickly locate information on those endeavors when needed. For example, a law firm may maintain a database of records that each pertain to a particular case and/or client, or a doctor's office may maintain a database of records that each relate to a particular patient and/or consultation. Employees within the law firm or doctor's office may employ a search engine to quickly access information on a particular endeavor by providing one or more keywords or phrases to a search engine that characterize the endeavor. The search engine (and/or an integrated interface) may generate a query based on the keyword(s) or phrase(s), and the query may be executed against the database. Results of the search may be provided to the user in the form of hyperlinks (e.g., to web pages that each display information stored in a record, such as further detail on the endeavor), although a summary representation of each result may be included as well.

Search engines used with either public or private data collections can suffer from various deficiencies. In particular, many search engines include a large number of irrelevant results in those which are presented to a user, and many search engines are unable to identify relevant search results. Irrelevant results, or those which do not meet the user's needs with respect to the search, may be produced because the quantity of data being searched is so vast, and the criteria provided by the user may be matched by many records in the data collection. As a result, many results presented to the user may include the keyword(s) or phrase(s) provided by the user, but may bear only a tangential or peripheral relationship to the information actually sought by the user, or no relationship at all. This may be because the user is unable to conceive of keyword(s) or phrase(s) that suitably identify the information sought without also identifying irrelevant information, or because the search engine is unable to properly classify results. Regardless, because a user's capacity to review search results is generally limited (one estimate indicates that the average user is willing to examine only the first 10-20 results), many users can be dissatisfied with the results identified. Moreover, as the amount of data stored in the typical data collection increases, the probability also increases that less relevant or irrelevant results will "wash out" results that interest the user.

A variety of attempts have been made to identify, and present first, the search results which are most relevant to the user. For example, the Google search engine ranks the relevance of search results based in part on the quantity of other Web pages that link to each page represented by a result. The theory is that results others find important likely will be results the user will find interesting. Other search engines, such as a meta-crawler search engine, aggregate results identified by multiple search engines, so that results deemed relevant by a plurality of search engines are designated most relevant overall.

Ultimately, these and other attempts have only marginally improved the identification and delivery of relevant search results. As a result, users spend more time than necessary searching for relevant information. This is costly for the business community and frustrating for users.

SUMMARY OF INVENTION

According to some embodiments of the invention, a method and system for improving the relevance of search results (from the user's perspective) is provided. We base our methods and system in part on a recognition that the relevance of an item identified as a result of a search may be influenced by not only whether the item's content includes a match for a keyword provided by a user, but also by the item's characteristics and previous user behavior with respect to the item.

Accordingly, some embodiments of the invention provide a computer-implemented method for retrieving data, the method comprising acts of: (A) receiving at least one search criterion from a user; (B) creating a query based on the at least one search criterion; (C) executing the query to generate results, each of the results corresponding to a respective data entity which satisfies the at least one search criterion; (D) arranging the results into an order, the order being determined at least in part by a characteristic of the data entity corresponding to each result and a previous act by a user with respect to the data entity corresponding to each result; and (E)

displaying the results to the user. The characteristic of the data entity corresponding to each result may comprise a period which has elapsed since a creation of the data entity, or a period which has elapsed since a creation of a physical item represented by said data entity. The previous act by a user with respect to the data entity may comprise a retrieval of the data entity, a retrieval of the physical entity represented by the data entity, or a modification of the data entity.

Other embodiments provide a computer-readable medium encoded with signals which, when processed by a computer, cause the computer to perform a method for retrieving data, the method comprising acts of: (A) receiving at least one search criterion from a user; (B) creating a query based on the at least one search criterion; (C) executing the query to generate a plurality of results, each of the plurality of results corresponding to a respective data entity which satisfies the at least one search criterion; (D) arranging the plurality of results into an order, the order being determined at least in part by a characteristic of the data entity corresponding to each result, and a previous act by a user with respect to the data entity corresponding to each result; and (E) displaying the results to the user. The characteristic of the data entity corresponding to each result may comprise a period which has elapsed since a creation of the data entity, or a period which has elapsed since a creation of a physical item represented by said data entity. The previous act by a user with respect to the data entity may comprise a retrieval of the data entity, a retrieval of the physical entity represented by the data entity, or a modification of the data entity.

Still other embodiments provide an article of manufacture comprising signals representing results generated by an information retrieval mechanism, the results being generated by executing a query based on at least one search criterion in response to receiving the at least one search criterion from a user, each of the results corresponding to a data entity which satisfies the at least one search criterion, the results being arranged into an order, the order being determined at least in part by a characteristic of a data entity corresponding to each result, and a previous act by a user with respect to a data entity corresponding to each result. The characteristic of the data entity corresponding to each result may comprise a period which has elapsed since a creation of the data entity, or a period which has elapsed since a creation of a physical item represented by said data entity. The previous act by a user with respect to the data entity may comprise a retrieval of the data entity, a retrieval of the physical entity represented by the data entity, or a modification of the data entity.

BRIEF DESCRIPTION OF DRAWINGS

The accompanying drawings are not intended to be drawn to scale. For purposes of clarity, not every component may be labeled in every drawing. In the drawings, in which like components are represented by like numerals:

FIGS. 8A-8E are representations of an exemplary GUI by means of which user input may be provided to execute an "advanced" search, and which may present the results of such a search, according to some embodiments of the invention.

DETAILED DESCRIPTION

Figure 1:
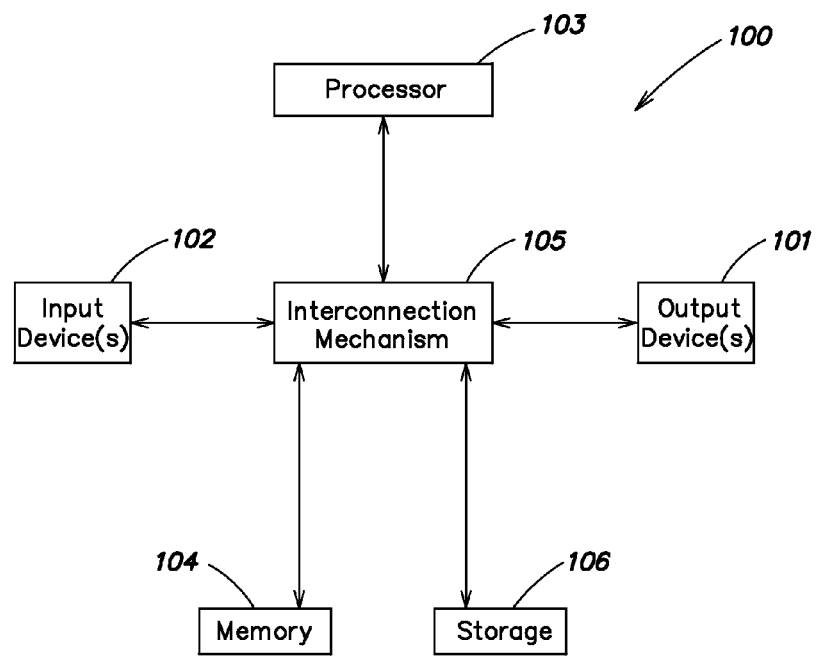
FIG. 1 is a block diagram of an exemplary computer system, with which embodiments of the invention may be implemented.

As discussed above, the relevance (to a searcher) of an item (e.g., a web page) identified as a result of a search is often influenced not only by whether the item contains a match for one or more keywords and/or phrases provided by a user, but also by one or more characteristics of the item, and by previous user behavior with respect to the item. For example, the relevance of an item with respect to a particular search may be influenced by characteristics such as the item's age (i.e., the period of time elapsed since the item was created and/or stored in digital form, which might not be expressed in the item's text) and/or other characteristics. An item's relevance may also be influenced by previous user behavior with respect to the item, such as a number of times that the user has previously searched for or otherwise accessed the item, and/or other indications of user behavior with respect to the item.

Accordingly, some embodiments of the invention provide a system for information retrieval that facilitates the presentation of search results in an order defined by their relevance with respect to the search. In some embodiments, the relevance of each item represented by a search result is determined not only by the extent to which the item contains content which matches the keyword(s) and/or phrase(s) provided by a user, but also by other measures such as one or more characteristics of the item, and previous user behavior with respect to the item. The system may include a graphical user interface (GUI) that allows the user to specify the keyword(s) and/or phrase(s), initiate a search, and/or view the results. The system may include electronic file storage, such as one or more databases or other suitable data structure(s), which may store information to be searched and may execute a query generated in response to the user's search request. The electronic file storage may facilitate the presentation of search results in an order or hierarchy defined by measures such as those listed above, by storing an indication of one or more of the measures with each item.

In some embodiments, the relevance of each item with respect to a search may be established by aggregating or evaluating a plurality of the measures. For example, an item's relevance with respect to a search may be defined by aggregating any two of the measures listed above, or any other subset thereof. Measures may be aggregated in any suitable fashion, such as by applying a mathematical function to numeric values assigned to the measures. For example, values could be multiplied or added to produce an aggregate "relevance score" for each item. Applying a mathematical function may allow one or more measures to be assigned a different importance with respect to the others, such as by assigning one or more of the measures a numeric weighting coefficient (which coefficients can be changed, perhaps algorithmically). Alternatively, items may be sorted according to one or more of the measures. For example, a sort may consider one of the measures first, then another of the measures, and so on as desired. Such a technique obviously allows one or more measures to be treated more favorably with respect to others. Yet another possibility is to combine certain aspects of the techniques described above, such as by multiplying one or more of the measures by a weighting coefficient, and then sorting the results. The invention is not limited to a particular implementation, as any suitable technique may be employed.

Embodiments of the invention may be implemented on any suitable computer system. For example, user input may be received, and search results may be displayed, via a browser application which executes on a personal computer, personal digital assistant (PDA), cellular phone or any other suitable device. Also, user input may be used to construct a query which executes on an electronic file storage residing on one or more general-purpose servers, server appliances, local or wide-area network storage, personal computers other suitable devices, or a combination thereof. Computer system 100, shown in FIG. 1, is an exemplary system on which aspects of the invention may be implemented, and is not a limiting aspect of the invention, but rather provides an environment for contextual reference.

Computer system 100 includes input device(s) 102, output device(s) 101, processor(s) 103, memory system(s) 104, and storage 106, all of which are coupled, directly or indirectly, via an interconnection mechanism 105, which may comprise one or more buses, switches, and/or networks. One or more input devices 102 receive input from a user or machine (e.g., a human operator, or programmed process), and one or more output devices 101 display or transmit information to a user or machine (e.g., a liquid crystal display). One or more processors 103 typically execute a computer program called an operating system (e.g., some version of Sun Solaris, Microsoft Windows®, or other suitable operating system) which controls the execution of other computer programs, and provides scheduling, input/output and other device control, accounting, compilation, storage assignment, data management, memory management, communication and data flow control. Collectively, the processor and operating system define the platform for which application programs in other computer program languages are written.

The processor(s) 103 may execute one or more programs (i.e., software) to implement various functions. These programs may be written in any type of computer programming language, including a procedural programming language, object-orientated programming language, macro language, other suitable language, or combination thereof. Programs may be stored in storage system 106. Storage system 106 may hold information on a volatile or non-volatile medium, and may be fixed or removable. Storage system 106 is shown in greater detail in FIG. 2.

Figure 2:
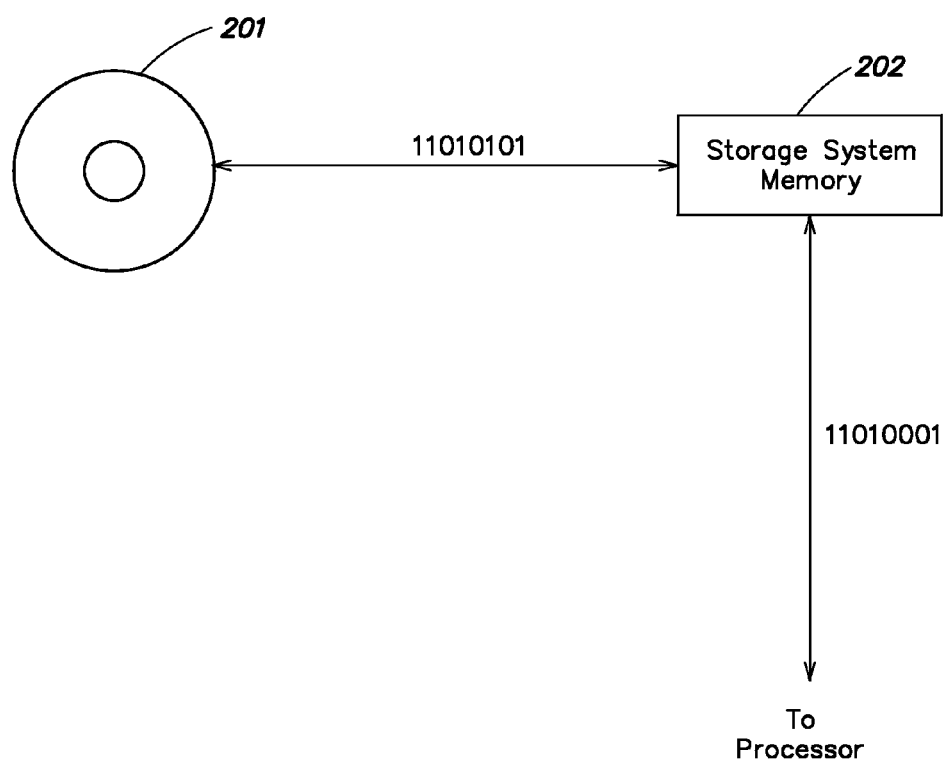
FIG. 2 is a block diagram of an exemplary computer memory, on which programmed instructions comprising illustrative embodiments of the invention may be stored.

Storage system 106 typically includes a computer-readable and computer-writeable non-volatile recording medium 201, on which signals are stored that define a computer program or information to be used by the program. The medium may, for example, be a disk, flash memory, or combination thereof. Typically, in operation, the processor 103 causes data to be read from the non-volatile recording medium 201 into a volatile memory 202 (e.g., a random access memory or RAM) that allows for faster access to the information by the processor 103 than does the medium 201. This memory 202 may be located in storage system 106, as shown in FIG. 2, or in memory system 104, as shown in FIG. 1. The processor 103 generally manipulates the data within the integrated circuit memory 104, 202 and then copies of the data to the medium 201 after processing is completed. A variety of mechanisms are known for managing data movement between the medium 201 and the integrated circuit memory element 104, 202, and the invention is not limited thereto. The invention is also not limited to a particular memory system 104 or storage system 106.

Aspects of the invention may be implemented as computer hardware, software, firmware, or combinations thereof. In addition, aspects of the invention, either individually or in combination, may be implemented as a computer program product (i.e., a software application), including a computer-readable medium encoded with instructions for access and execution by a computer processor. When executed by a computer, the instructions may instruct the computer to implement various aspects of the invention.

In some illustrative embodiments, a first computer system may execute a GUI application (e.g., a browser, or other suitable interface) with which a user may specify search criteria (e.g., in the form of keyword(s)), initiate a search based on the criteria, and view the results of the search. A second computer system (the word "system" is used here to encompass network-based implementations, although the invention is not limited as such) may store an electronic file storage containing the data to be searched. For example, the second computer system may execute a database management system which administers the storage of the data, and is capable of executing a query on the data. When the user supplies search criteria via the GUI application executing on the first computer, the GUI application may generate a query, and transmit the query to the electronic file storage on the second computer system for execution. Upon execution of the query by the electronic file storage, the second computer system may transmit information indicative of the results to the first computer system, which the GUI application may present to the user. However, as noted above, the invention is not limited to an implementation using two computer systems in network-based communication, as any suitable system configuration may be employed. For example, the electronic file storage and GUI application may reside on a single computer system. In other examples, one or more of the components described above may be distributed across a large number of computer systems.

Figure 3:
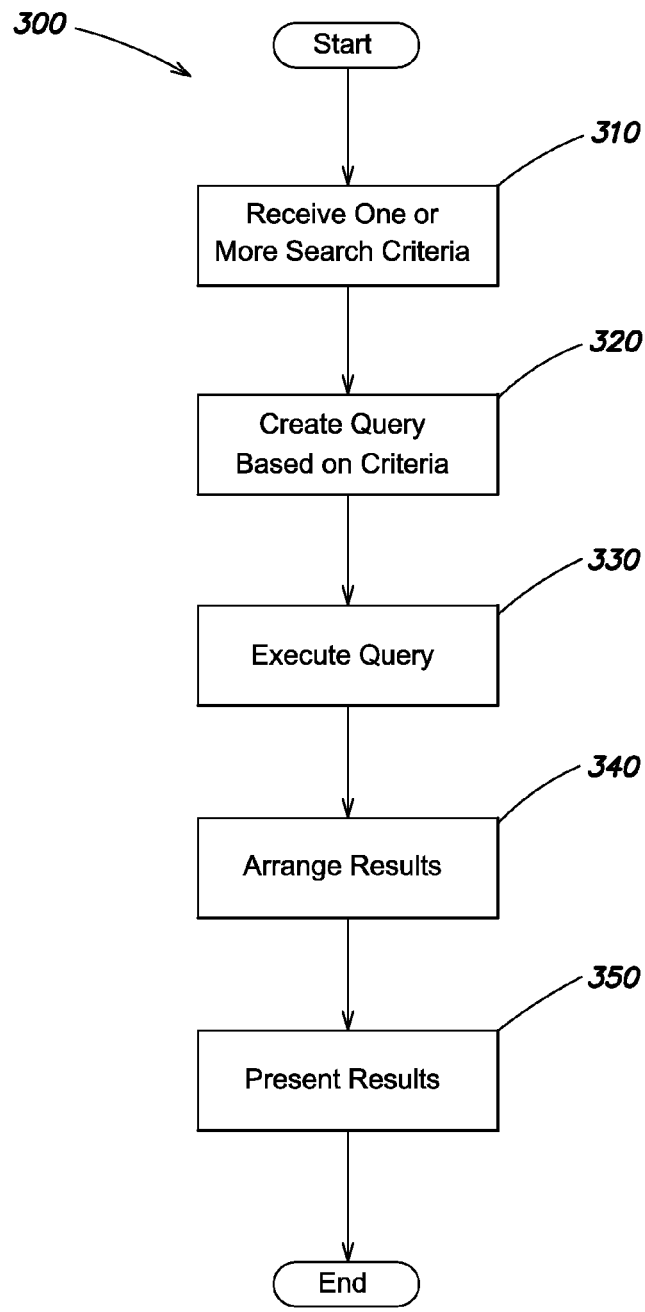
FIG. 3 is a flow chart depicting an exemplary process for executing a search process according to some embodiments of the invention.
Figure 4:
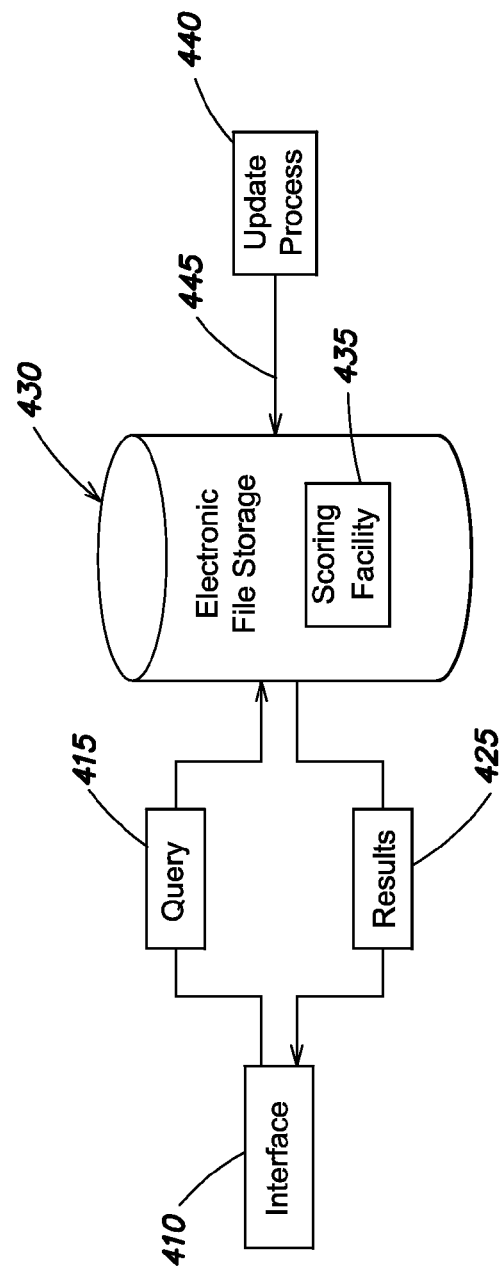
FIG. 4 is a block diagram depicting exemplary components of a system on which aspects of embodiments of the invention may be implemented.
Figure 5:
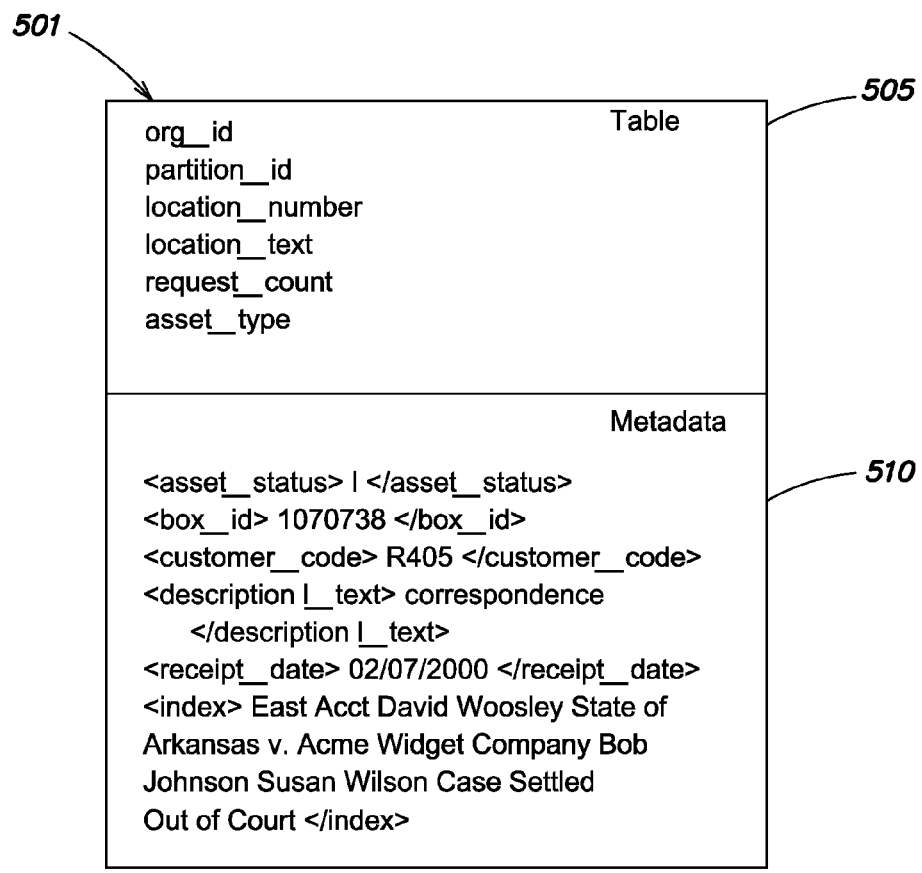
FIG. 5 is a block diagram depicting an exemplary information resource which may facilitate aspects of embodiments of the invention.
Figure 6:
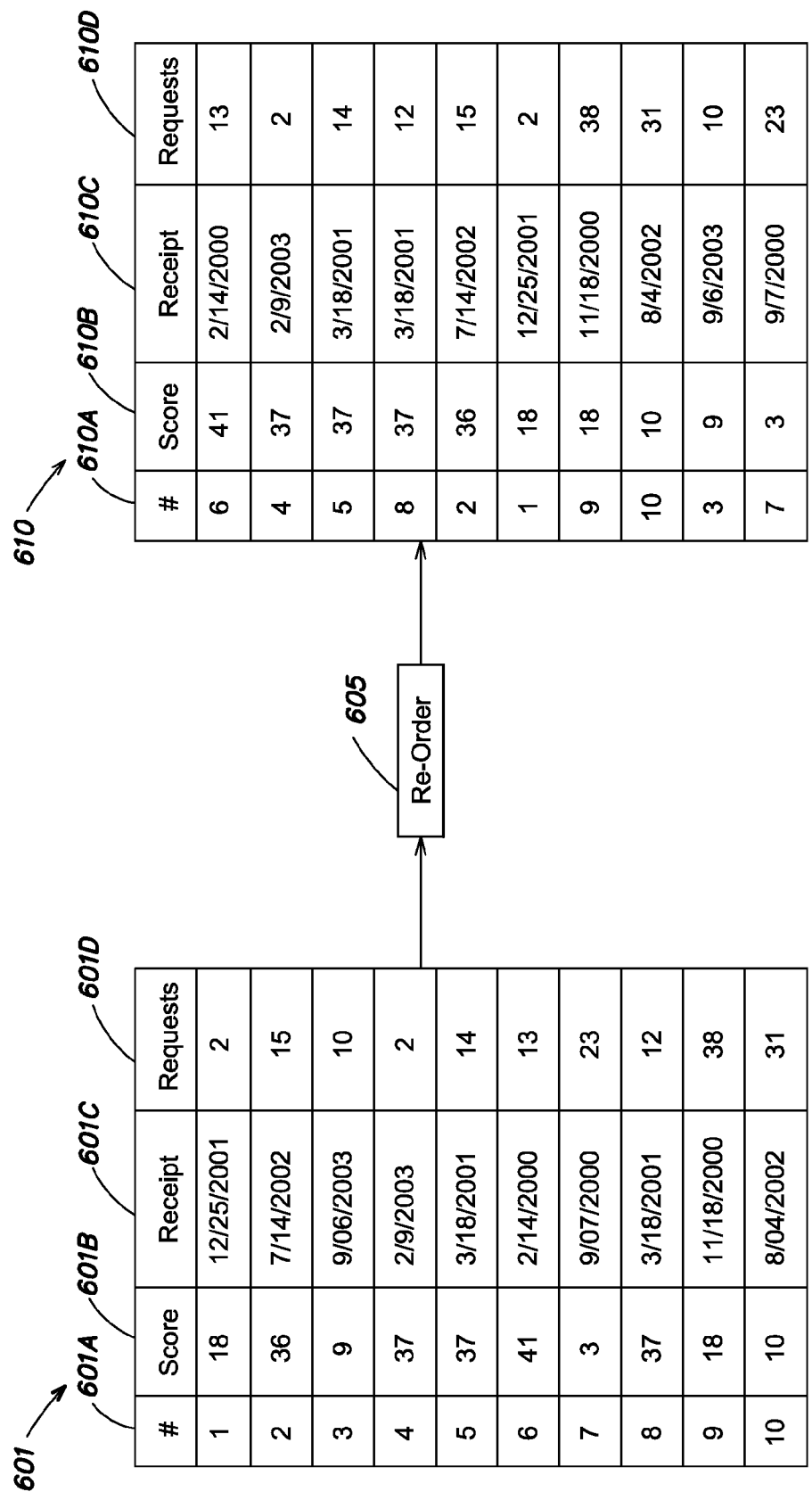
FIG. 6 is a representation of the manipulation of search results according to some embodiments of the invention.

Various aspects of embodiments of the invention are described below with reference to FIGS. 3-6. Specifically, FIG. 3 depicts an exemplary search process. FIG. 4 depicts exemplary system components by means of which a search according to the invention may be executed. FIG. 5 depicts an exemplary data arrangement which may be used to facilitate various aspects of the invention. FIG. 6 depicts an exemplary technique for data manipulation which may facilitate aspects of the invention.

Referring to FIG. 3, upon the start of the process 300, user input is received defining search criteria in act 310. User input may take any of numerous forms. For example, user input may comprise one or more keywords typewritten into a text box, a selection from a drop-down box, or any other suitable user indication which specifies one or more criteria that should characterize a search.

Input may be provided using, for example, interface 410 shown in FIG. 4. In some embodiments, interface 410 may comprise software configured to receive user input, and produce a graphical display, based on the search. For example, interface 410 may comprise a browser application, which may be configured to process data provided in any version of the Hypertext Markup Language Format (HTML) standard, any version of the Extensible Markup Language (XML) standard, or another suitable format, and create a graphical display based thereon. However, interface 410 need not comprise a browser application, as any suitable application may be employed. Further detailed description of the system configuration depicted in FIG. 4 is provided below.

Typically, the act 310 concludes upon the user's indication via interface 410 that the specification of search criteria is complete, and that the search should be executed. This indication may be provided in any of numerous ways, such as by clicking a hyperlink or button by means of which the user may initiate the search.

Upon the completion of act 310, the process proceeds to act 320, wherein a query is created based on search criteria provided by the user and transmitted for execution. The query 415 (FIG. 4) may be generated in any suitable fashion. For example, interface 410 may be configured to translate one or more search criteria into a query 415. However, the invention is not limited to such an implementation, as any other suitable facility may be employed.

A query may take any of numerous formats. For example, in some cases the format of the query may depend upon one or more characteristics of the data collection to be searched, such as electronic file storage 430 (FIG. 4). In some exemplary embodiments wherein electronic file storage 430 comprises a relational database system, the query may conform to Structured Query Language (SQL) conventions. That is, an SQL query may be generated which specifies or otherwise includes the search criteria provided by the user in the act 310.

In some embodiments, in addition to specifying search criteria, a query may also contain instructions designed to invoke one or more external facilities, such as a facility of the electronic file storage in which the data is stored (e.g., scoring facility 435 of electronic file storage 430 (FIG. 4)) which may aid in the execution of a search. For example, versions of the Oracle Relational Database Management System (RDBMS) from Oracle Corporation of Redwood Shores, Calif., provides a scoring algorithm which may be invoked by an SQL query, and which examines the prevalence of a search criterion (e.g., a keyword) within each database record in relation to the criterion's presence within the collection as a whole to produce a score for each record with respect to the criterion.

The Oracle RDBMS algorithm employs an inverse frequency function, meaning that the algorithm assumes that a keyword which appears in an item (i.e., a database record) but also appears frequently in the database overall is a "noise" term, and thus that the database record should be considered, a priori, to have low relevance with respect to a search for the keyword. Conversely, an item's relevance with respect to a search increases if it contains a keyword which appears infrequently in the database as a whole. For example, in a database containing items related to chemistry, wherein each record contains exactly one occurrence of the term "chemical," the term "chemical" would be considered a noise term, and no record would be deemed more relevant than any other with respect to a search for the term "chemical." However, if a record also contains five occurrences of the term "hydrogen," and no other record contains the term "hydrogen," then the record would be deemed more relevant than others with respect to a search for "hydrogen." Because adding, updating or deleting items in the database is likely to change the score for any item with respect to a particular search, the inverse frequency scoring algorithm mitigates the effect of adding new items to the database on searching.

In some embodiments, execution of a scoring algorithm is integrated into query execution, such that a score is calculated "on the fly" as the query is executed. However, the invention is not limited to such an implementation, as any suitable technique for calculating a score may be implemented. For example, a score could conceivably be calculated for common search keywords with respect to each record in the database upon the execution of an update to the database (e.g., update process 440, shown in FIG. 4).

It should be appreciated that query execution need not employ an algorithm such as that which is described above to determine the extent to which data in electronic file storage match one or more search criteria, as any suitable technique may be employed. In one example, multiple algorithms may be employed. In another example, no algorithm may be employed, and search criteria may simply be compared with data elements residing in electronic file storage to determine a match. The invention is not limited to a particular implementation.

In some embodiments, the query may be generated to request data which is not specified by the user as search criteria. For example, a query may specify one or more characteristics of each item, and previous user activity with respect to each item, regardless of whether the characteristic(s) and/or previous user activity are specified by the user as search criteria. The inclusion of a request for this data within the query may provide for ordering the query results (i.e., the search results) according to this data, at least in part. For example, if the requested data is included in query results, results may be arranged in an order that reflects the extent to which items match the search term, one or more characteristics of the items, and previous user activity with respect to the items. A much more detailed description of an exemplary arrangement of search results is provided below. In particular, a more detailed description of a data processing technique for arranging search results in order is provided below, and discussed with reference to FIG. 6.

In some embodiments, once created, the query 415 (FIG. 4) is transmitted to electronic file storage 430 for execution. This may be accomplished in any suitable fashion, and the technique for doing so may depend on the configuration depicted in FIG. 4. For example, if interface 410 and electronic file storage 430 are contained on the same computer system, communication of query 415 may be accomplished differently than if interface 410 and electronic file storage 430 are contained on different computer systems. Regardless, the communication of query 415 may be accomplished using any suitable communications device(s) and/or protocol(s).

Upon the completion of act 320, the process proceeds to act 330, wherein the query is executed. In some embodiments, a query is executed by electronic file storage 430, wherein data stored in the electronic file storage 430 is examined in relation to the query to determine whether the data satisfies the criteria specified by the query. For example, if the electronic file storage 430 comprises a relational database management system (RDBMS), the RDBMS may execute an SQL query to determine whether records stored in the relational database match criteria specified by the query.

In some embodiments, the execution of a query may involve examining only a portion of the data stored in electronic file storage 430 in relation to the query. For example, if the electronic file storage 430 comprises a database which stores information on multiple topics (e.g., data from various customers), only that data which pertains to a particular topic may be examined upon execution of the query. This method of query execution may be accomplished in any of numerous ways. For example, in embodiments wherein electronic file storage 430 comprises an RDBMS, a database partition may be employed, such that only a portion of the information stored in the database (e.g., information residing in a partition which is accessible to a user) is examined upon execution of the query.

FIG. 5 depicts an exemplary data storage arrangement which may facilitate various aspects of search query execution in accordance with the invention. FIG. 5 depicts data structure 501, which may represent one record stored in a database (e.g., a relational database) that is accessed during the execution of a search query. Data structure 501 stores information in both a traditional "table" format and in a metadata format. That is, data structure 501 contains a table portion 505 which contains a data element (or null value) in each table column within the "row" that makes up the record, and a metadata portion 510 which does not include these rows and columns. In some embodiments, data may be stored in metadata portion 510 in a format which complies with an XML standard. As such, data in metadata portion 510 may be stored "free-form," such that multiple data elements may be stored in the portion and labeled with their respective XML tags (instead of being "labeled" by the column in which they reside, as they would in a traditional relational table structure). For example, metadata portion 510 contains data elements which are labeled using XML tags including "asset_status," "box_ID," "customer_code," "description_one_text," "receipt_date," and "index,"

Storage of one or more data elements in metadata portion 510 in XML format may afford flexibility with respect to search execution, in several respects. First, the storage arrangement depicted in FIG. 5 may afford flexibility with respect to the data element types that may be contained within each database record. Specifically, any data element type may be stored for any record. Unlike with traditional relational table formats, a different column is not required to store each different data element type. As a result, greater data element type heterogeneity across records is possible using this storage technique.

Second, this storage arrangement may afford flexibility with respect to query creation. Specifically, while an SQL query executed on a traditional relational database must specify a specific column in which a requested data element resides, a query executed on a database which stores some or all data elements in a metadata portion in XML format may not be required to do so. A query directed at a record with a portion containing XML may simply be executed by examining all data elements contained in the portion. That is, the database management system may execute the query by comparing the search criteria specified therein to each data element in the portion, regardless of the tag associated with each element. For example, if a user wanted to search for all occurrences of the term "Enron" in a traditional relational database (i.e., consistent with table portion 505), the user would be forced to create a query that specifies a criterion of the term "Enron" for all columns, and the database would examine each column and row to determine the presence of the term "Enron." In contrast, with a database having a portion containing data in XML format, the user need only specify the presence of the term "Enron," and the database will search all information in the portion to determine whether "Enron" resides therein, regardless of the XML tag actually associated with the element.

Third, this storage arrangement may afford flexibility with respect to storing data which is not easily classifiable. For example, to store a type of data element in a traditional relational table that relates to only a small number of records therein, a new column must be created for the element (meaning that for the remainder of records that don't include the element, the column will remain vacant), or a "catch-all" column must be created (which can detract from the ability to update and access records using the data in the column). In contrast, a data element stored in a metadata portion in XML format does not require storage in a column, and the data element may store any information whatsoever, including a type of information which relates to only the considered record. For example, portion 510 includes an "index" data type, wherein an collection of terms related to the record shown in data structure 501 reside. These terms may include descriptive data that a user may wish to store in the data structure even though the terms do not conform to any of the data categories corresponding to columns in portion 505, or any of the other data element types provided with XML tags in portion 510. For example, the index element may store miscellaneous information on the record, such as the name of a related case ("State of Arkansas v. Acme Widgett Company"), involved or related parties ("Bob Johnson," "Susan Wilson,") and/or a disposition of the case ("case settled out of court").

In some embodiments of the invention, when a search query is executed on the electronic file storage 430 in act 330, the database management system may compare criteria specified in the query to each data element in a metadata portion of each record.

As discussed above, the query may also request one or more additional data elements contained in each record that satisfies the search criteria, in order to facilitate subsequent arrangement of search results according to relevance. These elements may reside in the same data structure (e.g., relational database table) as the elements which are examined to determine whether the record satisfies the search criteria, or in one or more other data structures. In embodiments wherein elements reside in the same relational database table, they may be contained in table portion 505, metadata portion 510, or both. For example, using the example of the data structure shown in FIG. 5, the query may request the element contained in the "request_count" column in table portion 505, and the element having an XML tag of "receipt_date" in metadata portion 510.

In some embodiments, one requested data element (e.g., the data element contained in the "request_count" column) provides an indication of previous user behavior with respect to the record. For example, in some embodiments, the data element provides a number of times that the record was previously requested. This may represent a number of times that a search was performed for criteria which the record satisfied, a number of times that the record was accessed by a user as a result of a search, a number of times that a physical entity which the record represents was retrieved (e.g., if the record provides data on a specific physical file, the number of times the file was physically retrieved), or any other suitable indication of previous user behavior with respect to the record. In other embodiments, the data element may provide an indication of the user's subjective estimation of the usefulness of the record. For example, the data element may provide an indication that a user previously executed a search which identified a result representing the record, and the user indicated that the result was irrelevant with respect to the search (e.g., by "de-selecting" the result on an interface screen). Any suitable indication of previous user behavior with respect to the record may be provided, as the invention is not limited to a particular implementation.

An indication of previous user behavior with respect to the record may take any of numerous forms. For example, an indication of previous user behavior with respect to the record may represent the behavior of a specific user with respect to the record, such as the user who executes the search. The indication may represent the behavior of a group of users, such as a team of users who commonly access a data collection in which the record is stored. Alternatively, the indication may represent the behavior of all users, or any other suitable population. The invention is not limited to any particular implementation.

In some embodiments, another of the requested data elements (e.g., the element having the "receipt_date" XML tag) provides an indication of the record's age. For example, in some embodiments, the data element may provide a period of time since the record was created, a period of time since one or more specific data elements contained in the record were updated, a period of time since a physical entity which the record represents was created (e.g., if the record provides data on a specific physical file, the period of time since the file was created), or any other suitable characteristic of the record.

In some embodiments, search results may be limited, such that one or more records which satisfy the search criteria may not be included and/or represented in search results. Limitation of the results of a search may be performed, for example, because the search is executed by a user who is authorized to access only a portion of the records. Like the embodiments described above wherein a query may be executed on only a portion of the records in electronic file storage (e.g., by employing a database partition), limitation of search results may be accomplished in any of numerous ways. For example, a programmed procedure may be employed which screens records that satisfy search criteria according to one or more predefined conditions, such as the user's authorization to view the records.

Upon the completion of act 330, the process proceeds to act 340, wherein the results of the search are arranged in an order according to the relevance of each item with respect to the search. In some embodiments, as discussed above, results may be arranged in order according to the extent to which one or more search criteria match content contained within a corresponding item (e.g., match a data element contained within table portion 505 and/or metadata portion 510 in data structure 501), one or more characteristics of the item, and/or previous user activity with respect to the item. For example, in some embodiments, results might be arranged in an order defined by the score assigned to each record by a scoring algorithm during the execution of the query, the age of each record (e.g., as defined by the data element residing in the "receipt_date" column in table portion 505), and a number of times that a user previously retrieved the record (e.g., as defined by the data element having the "request_count" XML tag in metadata portion 510).

As discussed above, arranging search results in order according to these measures may be accomplished in any of numerous ways. For example, results may be arranged by sorting according to one or more of the measures, by applying a mathematical function to one or more of the measures, or in any suitable manner. In some embodiments, results may be sorted by the score assigned to each record, then by the age of each record, then by the number of times that a user previously retrieved the record.

FIG. 6 illustrates an exemplary data processing technique for arranging search results according to the relevance of corresponding items. Depicted in FIG. 6 is a data structure 601, which contains ten search results generated as a result of a query. Data structure 601 can be thought of as a table containing four columns, 601A (a result number), 601B (a score assigned to the record corresponding to the result), 601C (a receipt date for the record corresponding to the result) and 601D (a number of requests for the record corresponding to the result). Data structure 610 contains the same four columns, numbered 610A-610B. Within each of data structures 601 and 610 reside ten search result records. Within data structure 601, these results are arranged in an order defined by the result number (i.e., in column 601A).

In accordance with the depicted technique, data structure 601 is processed by reorder function 605 to produce data structure 610. Reorder function 605 may be a programmed procedure, which may execute on electronic file storage 430 (FIG. 4), interface 410, or any other suitable device. Reorder function 605 is configured to arrange search results from data structure 601 in an order defined by the relevance of the records corresponding to each result. In the exemplary embodiment depicted, relevance is defined by the score of the record corresponding to each result, the receipt date of the record, and the number times that the record has been retrieved. Also in the exemplary embodiment depicted, the reorder function 605 arranges the results in order by sorting the results by the score, then by the receipt date, then by the number of requests.

As a result of processing by reorder function 605, results in data structure 610 are arranged in a different order than in data structure 601. Specifically, as a result of processing by reorder function 605, record number 6 in data structure 601 no longer resides in the sixth position in data structure 610, but rather has been placed in the first position. This is because the record corresponding to result 6 had the highest score of all records in data structure 601.

Similarly, results 4, 5 and 8 from data structure 601 have been placed in the second, third and fourth positions in data structure 610. Each of results 4, 5 and 8 possesses the same score, which is the second-highest among all the results, but each also has different receipt dates and number of requests. Specifically, result 4 has a more recent receipt date than results 5 or 8, and is thus placed in the second position in data structure 610. Results 5 and 8 have the same receipt date, but result 5 had a greater number of requests. Thus, result 5 is placed in the third position, and result 8 is placed in the fourth position, in data structure 610. Other results in data structure 601 are arranged in order by reorder function in similar fashion to produce data structure 610.

Referring again to FIG. 3, upon the completion of act 340, the process proceeds to act 350, wherein search results are presented. In some embodiments, the act 350 includes the transmission of results 425 (FIG. 4) from electronic file storage 430 to interface 410 for presentation to a user. Transmission from electronic file storage 430 to interface 410 may be accomplished in any suitable fashion, such as by transmitting the results across a LAN, WAN, wireless network, other network or combinations thereof. Transmission may be accomplished using any suitable communications protocol or combination of protocols, such as via HTTP and TCP/IP. In addition, results 425 may comply, in whole or in part, with any suitable data format, such as HTML, XML, WML or a combination thereof.

Again, results 425 may be presented by interface 410 in a manner which reflects the relevance of the items to which they correspond. As such, in some embodiments, results 425 may comprise data structure 610 (FIG. 6).

Results 425 may comprise any suitable information. For example, as discussed above, each of results 425 may comprise a hyperlink to a record (e.g., a record stored in electronic file storage 430). However, the invention is not limited to such an implementation, as results 425 may take any of numerous forms apparent to those skilled in the art. For example, results 425 may comprise one or more data elements taken from each record, such that presentation of the data elements provides a summary version of the record, or a representation of the entire record.

Results 425 may be displayed by interface 410 via a browser application executing thereon. For example, results 425 may comprise data provided in markup language format, which may be processed by the browser application to create a graphical display of the results. However, the invention is not limited to such an implementation, as interface 410 may comprise any suitable system configuration (e.g., software, hardware, firmware, or a combination thereof) for processing results 425 such that results 425 are presented on a GUI.

Figure 7A:
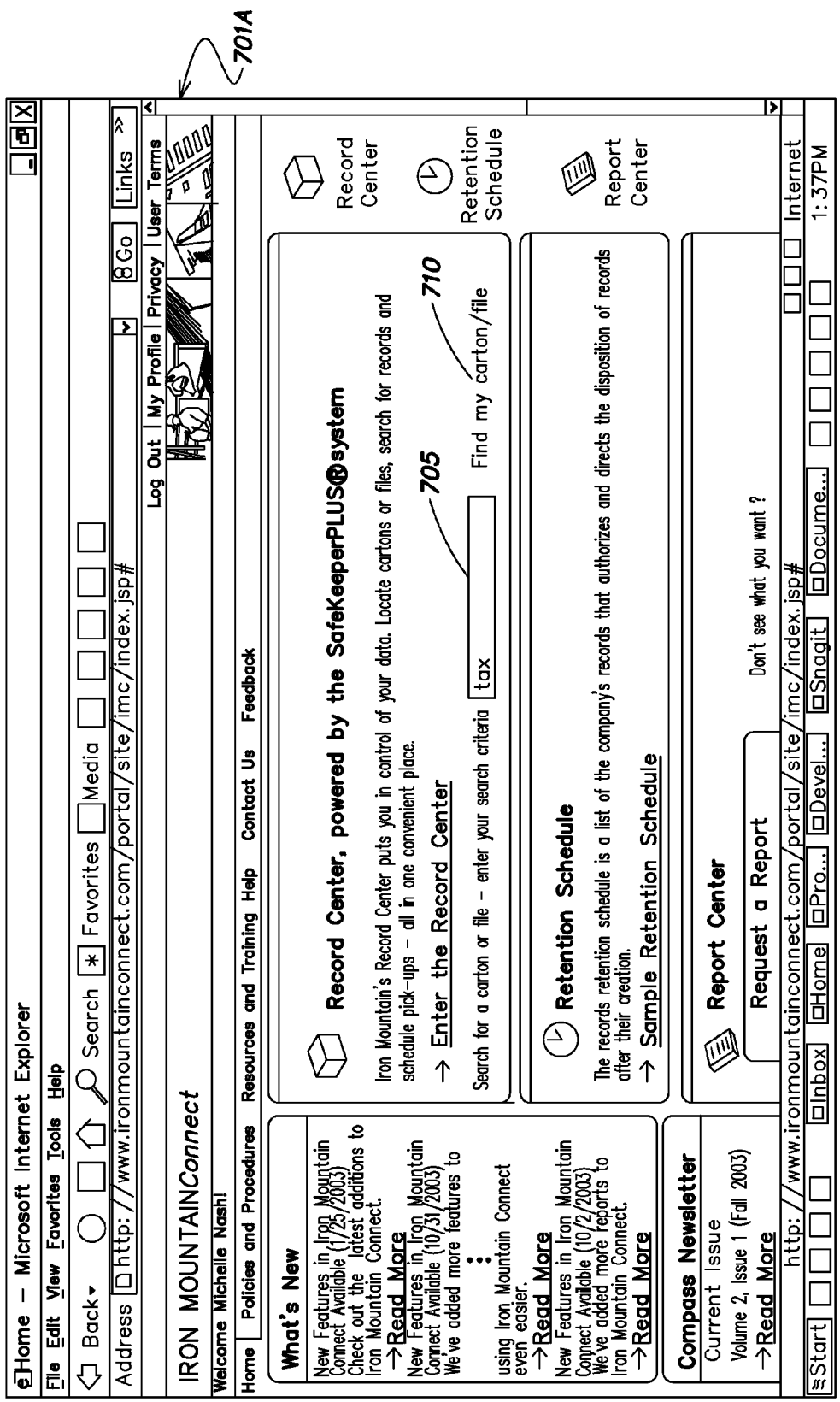
FIGS. 7A-7C are representations of an exemplary graphical user interface (GUI) by means of which user input may be provided to execute a "simple" search, and which may present the results of such a search, according to some embodiments of the invention.
Figure 7B:
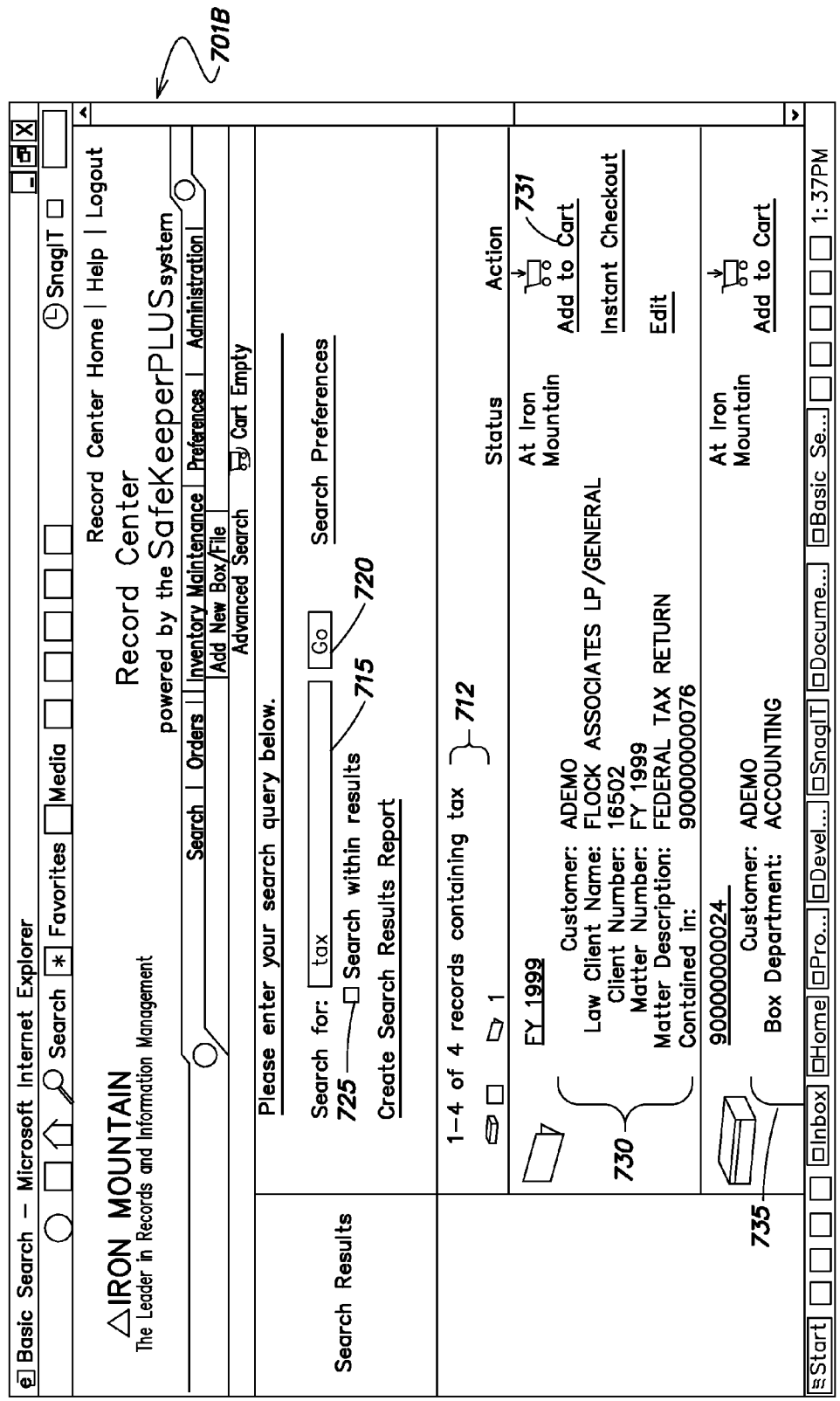
Figure 7C:
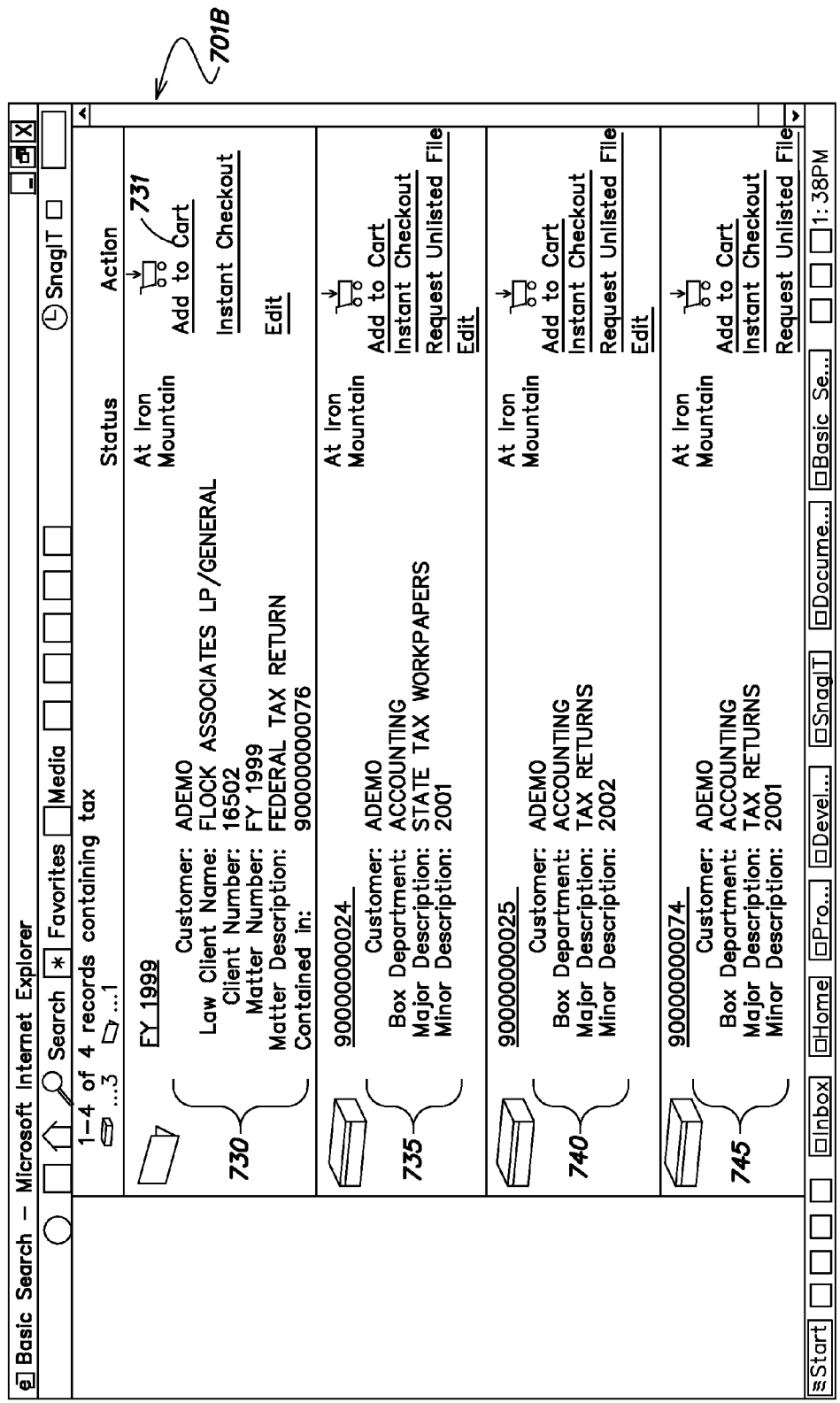

FIGS. 7A-7C depict an exemplary GUI which may be employed by a user to facilitate various aspects of the invention. For example, a user may employ the GUI shown in FIGS. 7A-7C to provide search criteria and view search results.

FIG. 7A depicts screen 701A, which comprises a screen of a conventional browser application, such as which may execute on a personal computer, PDA, cell phone or other suitable device. Screen 701A includes input mechanism 705, by means of which a user may provide input defining one or more search criteria. In the embodiment shown, input mechanism 705 comprises a text box by means of which a user may provide typewritten input, although the invention is not limited to such an implementation. For example, as is described below with reference to FIGS. 8A-8E, an input mechanism may include any suitable mechanism, such as a drop-down list, menu listing, touch screen console, voice response unit or other mechanism.

Screen 701A also includes initiation mechanism 710, by means of which a user may initiate the execution of a search, such as upon the completion of search criteria input. In the embodiment shown, initiation mechanism 710 comprises a button representing a hyperlink which, when clicked by a user, invokes a programmed procedure that initiates a search process. However, the invention is not limited to such an implementation, as initiation mechanism may comprise any suitable mechanism, such as an icon, button, or other mechanism. 4

In some embodiments, execution of a search causes the screen 701A to be replaced by the screen 701B, shown in FIGS. 7B and 7C. Shown by screen 701B are results 730, 735, 740 and 745, which comprise representations of records (e.g., records stored in electronic file storage 430) which satisfy the search criterion entered by the user in input mechanism 705. Specifically, the results 730, 735, 740 and 745 represent records stored in electronic file storage which contain the term "tax" supplied by the user in input mechanism 705 (as indicated by text 712). Each of results 730, 735, 740 and 745 comprise select data elements from those records, although, as discussed above, any or all of the results 730, 735, 740 and 745 might also be presented as a hyperlink (e.g., to a web page), or any other suitable representation of the record stored in electronic file storage.

In addition, results 730, 735, 740 and 745 are arranged on screen 701B in an order which reflects the relevance of the underlying records with respect to the search criterion supplied by the user in input mechanism 705. Specifically, the results 730, 735, 740 and 745 are presented in an order which reflects the extent to which the underlying record (e.g., data structure 501) contains a data element (e.g., contained in table portion 505 or metadata portion 510) which matches the criterion supplied by the user, one or more characteristics of the record (e.g., the age of the record, defined as the period of time since the record was created), and previous user behavior with respect to the record (e.g., a number of times which a user has retrieved the record). In some embodiments, the data processing technique described with reference to FIG. 6 may be employed to arrange the records in the order shown on screen 701B, although the invention is not limited to such an implementation.

In some embodiments, retrieval mechanism 731 allows a physical entity associated with the record represented by the result 730 to be retrieved. For example, retrieval mechanism 731 may allow a physical file associated with the record represented by result 730 to be retrieved from storage. In some embodiments, retrieval of the physical entity may cause one or more characteristics of the record to be updated. For example, retrieval of the physical entity may cause a data element included in the record, such as one which represents a quantity of times that the entity was retrieved, to be modified (e.g., incremented). Further, this data element may be employed in the determination of the record's relevance with respect to a search. For example, the data processing technique described with reference to FIG. 6 may employ the data element to represent the number of times that the record was requested, and arrange results in order based in part on the data element to present the results in order of relevance.

Screen 701B also includes several mechanisms 715, 720, 725 by means of which the user may re-execute a search or execute a new search, such as where results returned by the original search are unsatisfactory. This may be for any of numerous reasons, such as where the results were too voluminous or too little, results were too inclusive or not inclusive enough, or any other reason which causes the results to be unsatisfactory from the user's perspective. For example, a user may employ mechanisms 715, 720, 725 to re-execute the search if the results shown on screen 701B are too inclusive, whereby search re-execution occurs on the results generated by the first search. For example, if the user had provided a search criterion of "tax" via input mechanism 705 and decided that the results 730, 735, 740 and 745 were too inclusive, the user might employ input mechanism 715 to provide typewritten input of the word "return," click mechanism 725 to indicate that the re-execution of the search should occur on the results generated by the original search, and mechanism 720 to re-execute the search, thereby generating a new set of results which satisfied both search criteria. Alternatively, the user may provide a new search criterion in input mechanism 715, and click mechanism 720 without clicking 725 to execute a new search, whose results may or may not relate to results generated by the original search.

FIGS. 8A-8E depict an alternative exemplary GUI which may be employed by a user to facilitate various aspects of the invention. Like the GUI depicted in FIGS. 7A-7C, the GUI shown in FIGS. 8A-8E may be employed by a user to provide search criteria and view search results.

Figure 8A:
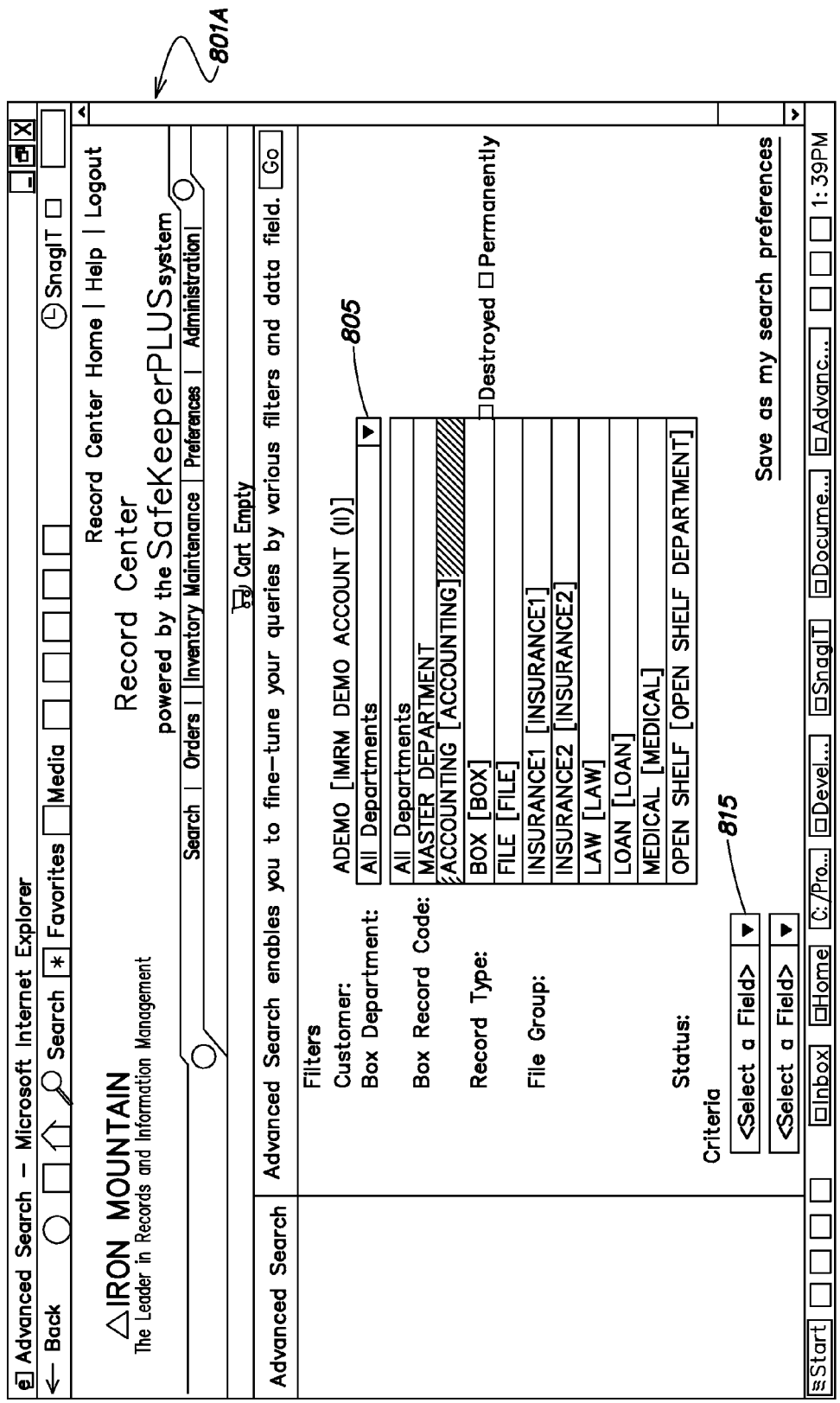

FIG. 8A depicts screen 801A. Like screen 701A, screen 801A comprises a browser application. Screen 801A includes input mechanism 805, by means of which a user may provide input defining a search criterion. In the embodiment shown, input mechanism 805 comprises a drop-down box by means of which a user may select from a list or predefined search criteria. For example, in the embodiment shown, input mechanism 805 may allow a user to select from a list of predefined criteria which specify an organizational department from which a physical entity (e.g., a file) represented by a record (e.g., stored in electronic file storage 430) originates.

Screen 801A also includes input mechanism 810, which comprises a collection of check-boxes. In the embodiment shown, the input mechanism 810 allows a user to specify an additional criterion describing a physical entity represented by a record (and search result). Specifically, input mechanism 810 allows a user to specify where the physical entity is stored. In the embodiment shown, the user has selected that the physical entity may be stored at any location (i.e., the user has checked "All" locations, thereby not limiting the search to any location), although any of the check-boxes comprising input mechanism 810, or a combination thereof, may be checked by the user.

Figure 8B:
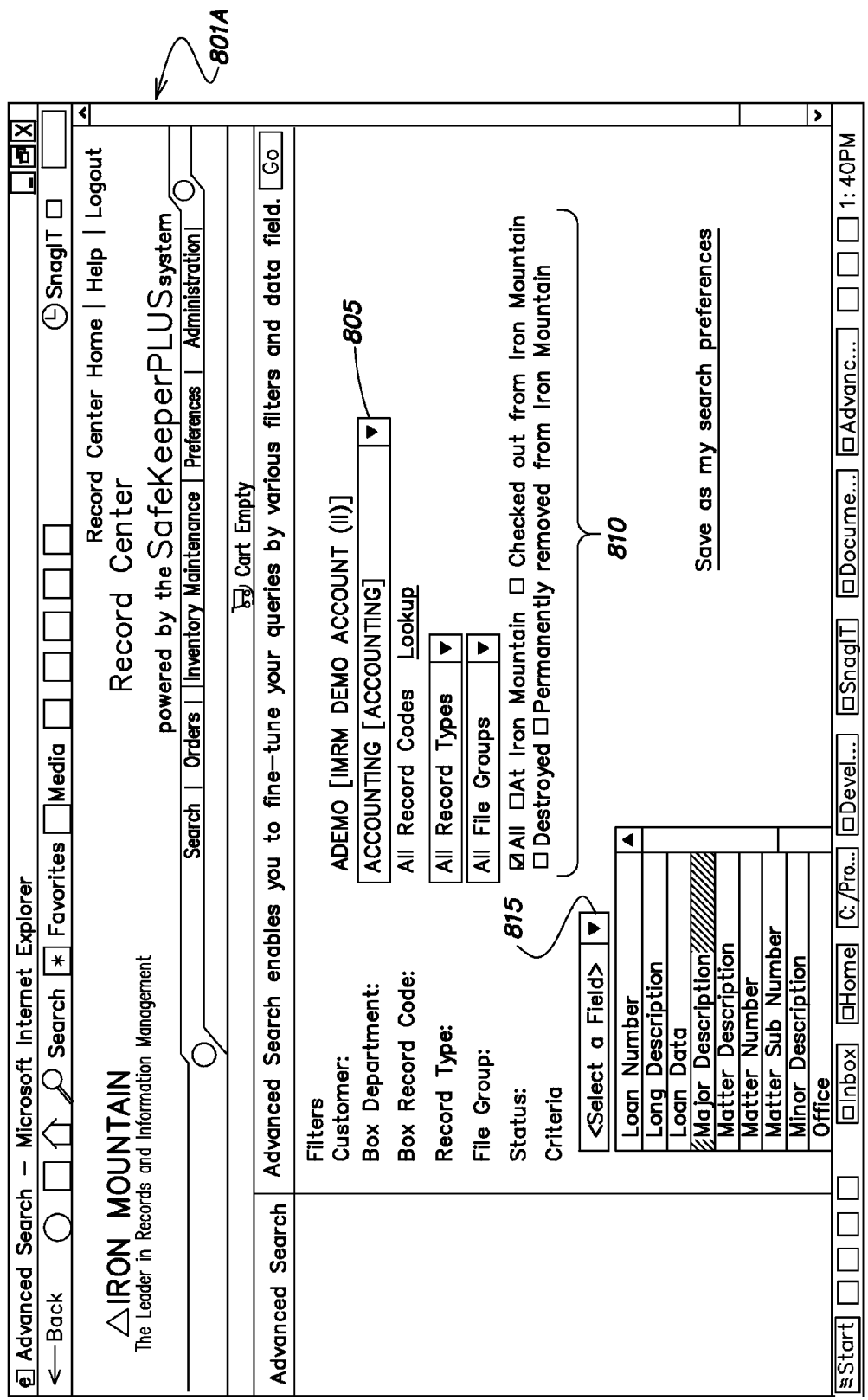
Figure 8C:
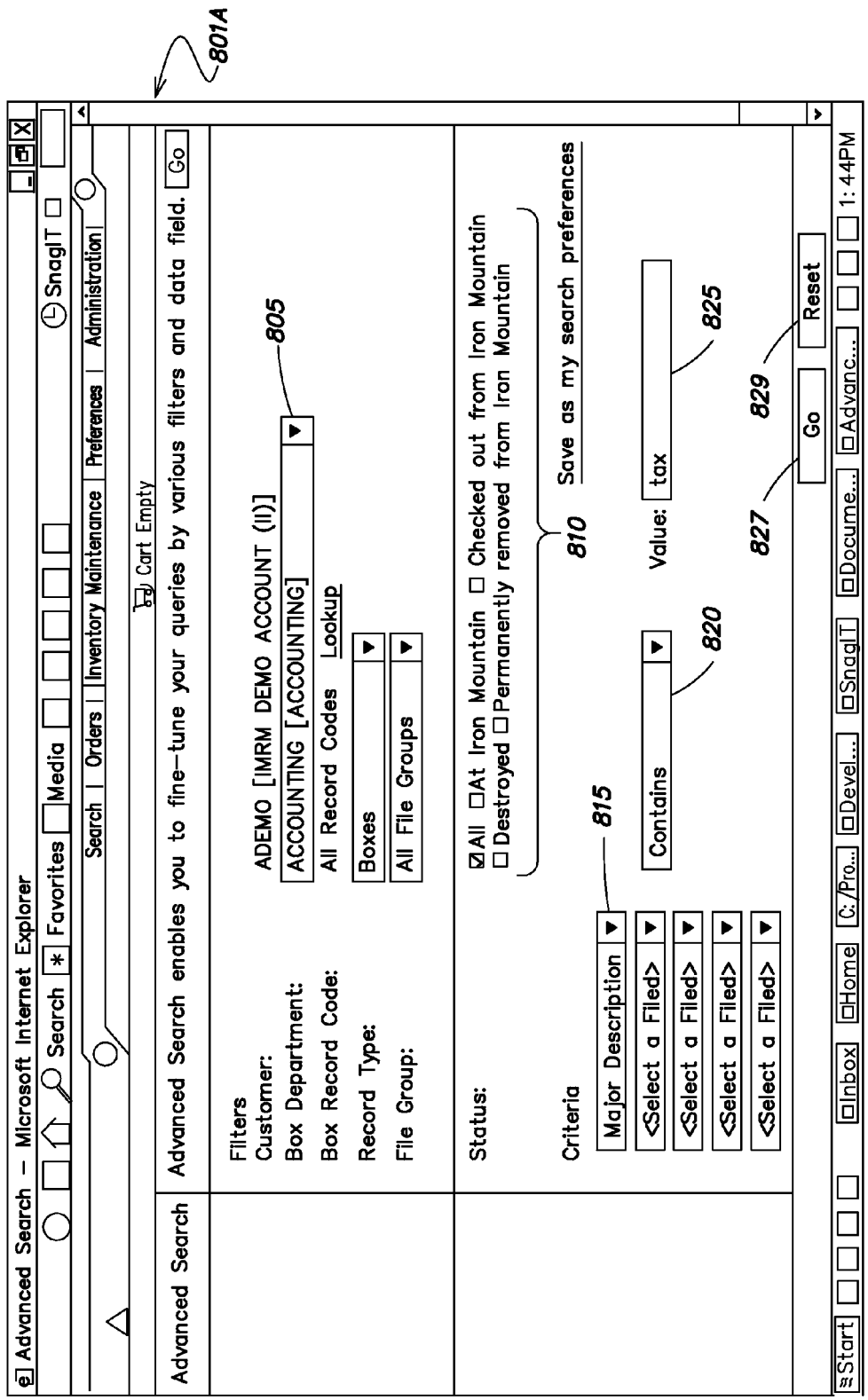

Screen 801A also includes input mechanism 815. As depicted in FIG. 8B, the drop-down box allows the user to select from a listing of predefined descriptors with which the user may further define one or more search criteria. For example, FIG. 8B indicates that the user has selected the descriptor "Major Description." As shown in FIG. 8C, once a user completes that selection, input mechanisms 820 and 825 appear, with which the user may more fully describe the search criteria. For example, FIG. 8C indicates that, with input mechanism 820, the user has specified that the "Major Description" descriptor selected from input mechanism 815 should "Contain" a term. Further, input mechanism 825 indicates that the user has specified that the "Major Description" descriptor should contain the term "tax." Input mechanism 820 may define any association between a descriptor and a term. For example, input mechanism 820 may be a drop-down box which contains a listing of Boolean expressions.

In some embodiments, the list of descriptors provided in input mechanism 815 may comprise descriptors for data elements provided by the data structure 501 (FIG. 5). Specifically, the descriptors provided in input mechanism 815 may comprise column names as defined within table portion 505, or XML tags provided within metadata portion 510, other descriptors, or a combination thereof. For example, the list of descriptors provided in input mechanism 815 may comprise all of the column names and metadata tags found in data structure 501. Using this example, when a user indicates that the descriptor "Major Description" should contain a term supplied in input mechanism 825, the user indicates that a data element contained in a column having the name "Major Description" should contain (e.g., include) the term, or that a data element contained in a metadata portion having an XML tag "Major Description" should contain the term.

Screen 801A also includes initiation mechanism 827, by means of which a user may initiate the execution of a search using the criteria specified. In the embodiment shown, initiation mechanism 827 comprises a box which, when clicked by a user, invokes a programmed procedure that initiates a search process. However, initiation mechanism 827 may comprise any suitable mechanism, such as an icon, button, or other mechanism. In addition, screen 801A includes reset mechanism 829, by means of which a user may discard or clear search criteria specified using input mechanisms 805, 810, 815, 820 and 825. In some embodiments, upon clicking reset mechanism 829, the user may invoke a programmed procedure which returns the screen 801A to a state such as which is depicted in FIG. 8A (i.e., without the complete drop-down list 805 being shown). Like initiation mechanism 827, reset mechanism 829 need not comprise a box, and may comprise any suitable mechanism.

Figure 8D:
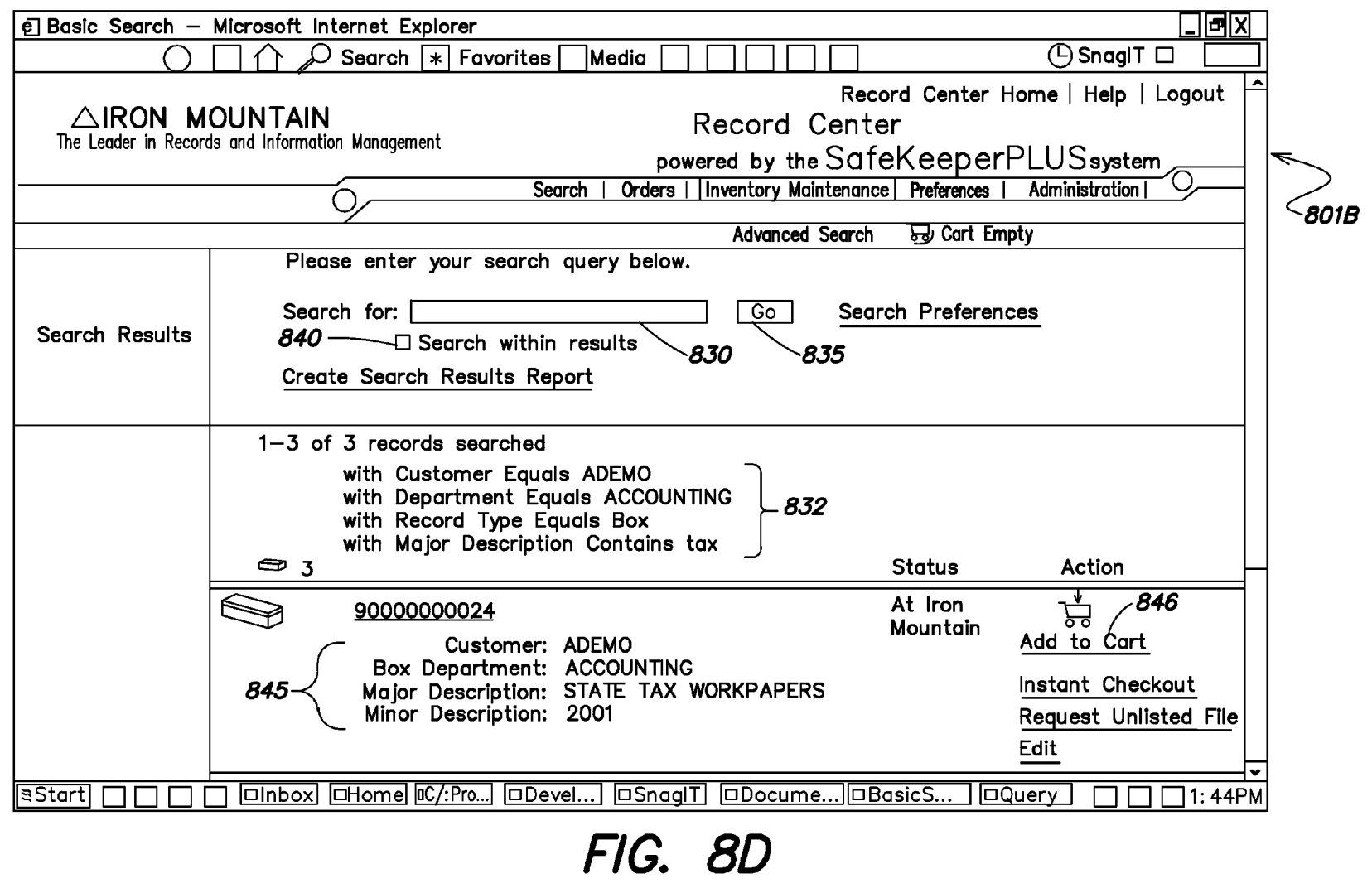
Figure 8E:
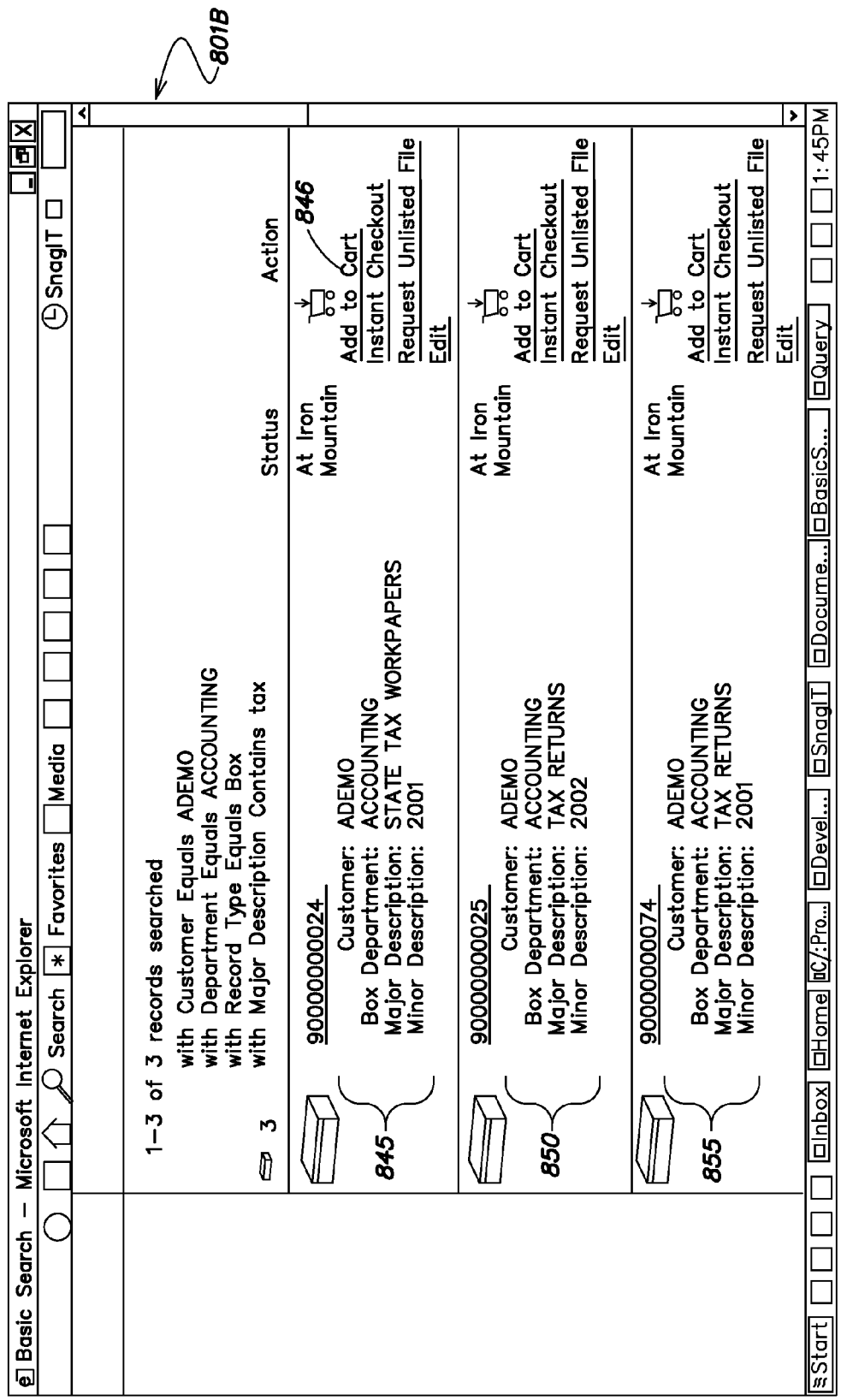

In some embodiments, execution of a search via initiation mechanism 827 causes screen 801A to be replaced by screen 801B, shown in FIGS. 8D and 8E. Included in screen 801B are results 845, 850, 855, which comprise representations of records (e.g., records stored in electronic file storage 430) that satisfy the search criteria supplied by the user. Specifically, the results 845, 850, 855 may represent records stored in electronic file storage which represent physical entities created by the "Accounting" department, and whose "Major Description" contains the term "tax." Like the results depicted in screen 701B (FIGS. 7B-7C), the results 845, 850, 855 comprise predefined data elements from the records, although any or all of the results 845, 850, 855 might also be presented as a hyperlink (e.g., to a web page), or any other suitable representation of the record stored in electronic file storage.

In addition, like the results shown on screen 701B, results 845, 850, 855 are arranged on screen 801B in an order which reflects the relevance of the underlying records with respect to the search criteria supplied by the user. Specifically, results 845, 850, 855 are presented in an order which reflects the extent to which each underlying record (e.g., data structure 501) contains a data element (e.g., in table portion 505 or metadata portion 510) which matches the criterion supplied by the user, one or more characteristics of the record (e.g., the age of the record, defined as the period of time since the record was created), and previous user behavior with respect to the record (e.g., a number of times which a user has retrieved the record). As with the results displayed in screen 701B, the data processing technique described with reference to FIG. 6 may be employed to arrange the records in the order shown on screen 801B, although the invention is not limited as such.

Like the retrieval mechanism 731 (FIG. 7B), retrieval mechanism 846, shown in FIG. 8D, may allow a physical entity associated with a record represented by result 845 to be retrieved. For example, retrieval mechanism 846 may allow a physical file associated with the record represented by result 845 to be retrieved from storage. In addition, as with the retrieval mechanism 731, use of the retrieval mechanism 846 may cause one or more characteristics of the record to be updated, such as by causing a data element which represents a quantity of times that the entity was retrieved, to be modified (e.g., incremented). The data element may be employed in the determination of the record's relevance with respect to a search.

Like the input mechanisms 715, 720, 725 included in screen 701B, the input mechanisms 830, 835 and 840 may allow a user to re-execute a search or execute a new search. As such, the description provided above with reference to FIG. 7B will not be repeated here.

Various aspects of the invention, and the exemplary embodiments thereof, may be implemented in any suitable manner. For example, any subset of the above-described features may be implemented in combination, as the invention is not limited to being wholly implemented.

Further, it should be appreciated that one possible implementation of embodiments of the invention comprises a computer-readable medium (e.g., a semiconductor memory, magnetic medium and/or optical medium such as floppy disk, compact disk, tape, etc.) encoded with one or more computer programs (i.e., each including a plurality of instructions), which, when executed on a processor or processors, performs some or all of the functions described above of the illustrative embodiments of the present invention. As used herein, the term computer-readable medium is used generically, but may refer to a plurality of computer-readable media. A computer-readable medium may be transportable, such that programs stored thereon can be loaded onto one or more computer system resources (which may themselves comprise computer-readable media) to implement aspects of the present invention. For example, more than one transportable computer-readable medium (e.g., floppy disks and/or compact disks) may be employed to load programs on to more than one other computer-readable medium (e.g., semiconductor memories and/or flash memories) to implement aspects of the invention.

Moreover, it should be appreciated that one possible implementation of embodiments of the invention comprises an article of manufacture comprising signals representing results generated by an information retrieval mechanism. For example, signals may be produced by a search engine application executing on one or more servers, which signals represent search results produced as a result of executing a search query. Such signals may represent search results which are arranged into an order according to their relevance. The arrangement of results into an order may be performed by an application program executing on one or more servers, or by an application program executing on one or more client devices, a combination thereof, or any other suitable implementation. Thus, the article of manufacture comprising signals may be produced by any suitable component, and the invention is not limited to a particular implementation.

In addition, it should be appreciated that the reference to a computer program which, when executed, performs one or more of the functions described above, is not limited to an application program running on a computer. Rather, the term computer program is used herein in a generic sense to reference any type of computer code (e.g., software or microcode) that can be employed to program any processor to implement the above-discussed aspects of the present invention.

It should be appreciated that in accordance with several embodiments of the present invention wherein the above-described processes are at least partially implemented with a computer, these processes may, during the course of their execution, receive input manually (e.g., from a user), in the manners described above, or in other manners. In addition, the processes described may receive input from other electronic processes, which may be provided without the active involvement of a human operator.

Having described several aspects of at least one embodiment of this invention, it should be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. In a system having data maintained in electronic file storage, said data corresponding to a plurality of physical entities, a computer-implemented method for retrieving indicia of said physical entities from said data, the method comprising acts of:
   (A) receiving at least one search criterion from a user;
   (B) creating a query based on the at least one search criterion;
   (C) executing the query against the electronic file storage to generate results, each of the results corresponding to a respective data entity which satisfies the at least one search criterion and corresponds to a respective physical entity;
   (D) arranging the results into an order, the order being determined at least in part by a characteristic of the physical entity corresponding to each result and a previous act by a user with respect to the physical entity; and
   (E) displaying the results to the user.

2. The method of claim 1, wherein the characteristic of the physical entity corresponding to each result comprises a duration of an interval which has elapsed since a creation of a the physical entity.

3. The method of claim 2, wherein the physical entity comprises a physical file.

4. The method of claim 1, wherein the previous act by a user comprises a retrieval of the physical entity.

5. The method of claim 1, wherein the previous act by a user comprises a quantity of times the physical entity has been retrieved in a defined interval.

6. The method of any of claims 4-5, wherein the previous act of retrieval was performed by a first user, and the act (E) comprises displaying the results to the first user.

7. The method of claim 1, wherein the previous act was performed by a first user, and the act (E) comprises displaying the results to the first user.

8. The method of claim 1, wherein each of the characteristics of the physical entity corresponding to each result and the previous act by a user with respect to said physical entity are represented by one or more data elements associated with said data entity in the electronic file storage.

9. The method of claim 8, wherein the one or more data elements comply with an XML standard.

10. The method of claim 1, wherein the electronic file storage comprises a database.

11. The method of claim 10, wherein the database further comprises a relational database, the act (B) further comprises creating an SQL query, and the act (C) further comprises executing the SQL query on the relational database.

12. The method of claim 11, wherein the act (D) further comprises arranging the plurality of results into an order defined by at least one instruction provided in the SQL query.

13. The method of claim 1, wherein the act (A) further comprises receiving at least one search criterion from a first user, and the act (E) further comprises displaying results which the first user is authorized to view.

14. The method of claim 13, wherein the act (C) further comprises executing the query against a portion of the electronic file storage comprising data entities which the first user is authorized to view, and wherein the act (E) further comprises displaying results from the execution of the query to the first user.

15. The method of claim 14, wherein the electronic file storage is a database, and the portion of the database comprising data entities which the first user is authorized to view is defined by a database partition.

16. The method of claim 13, wherein the act (E) further comprises executing a programmed procedure to limit the results to those satisfying a predefined condition, so that the only results displayed are those which the first user is authorized to view.

17. The method of claim 1, wherein the characteristic of the physical entity corresponding to each result comprises an interval which has elapsed since a retrieval of the physical entity.

18. The method of claim 1, wherein the characteristic of the physical entity corresponding to each result comprises a quantity of times that the physical entity has been retrieved during an interval.

19. A computer-readable medium encoded with signals which, when processed by a computer in a system having data maintained in electronic file storage, said data corresponding to a plurality of physical entities, cause the computer to perform a method for retrieving data, the method comprising acts of:
   (A) receiving at least one search criterion from a user;
   (B) creating a query based on the at least one search criterion;
   (C) executing the query against the electronic file storage to generate results, each of the results corresponding to a respective data entity which satisfies the at least one search criterion and corresponds to a respective physical entity;

(D) arranging the results into an order, the order being determined at least in part by a characteristic of the physical entity corresponding to each result, and a previous act by a user with respect to the physical to each result; and (E) displaying the results to the user.

20. The computer-readable medium of claim 19, wherein the signals comprise instructions.

21. The computer-readable medium of claim 20, wherein the characteristic of the physical entity corresponding to each result comprises a time interval which has elapsed since creation of the physical entity.

22. The computer-readable medium of claim 21, wherein the physical entity comprises a physical file.

23. The computer-readable medium of claim 20, wherein the previous act by a user comprises a retrieval of the physical entity.

24. The computer-readable medium of claim 20, wherein the previous act by a user comprises a quantity of times the physical entity has been retrieved in a defined interval.

25. The computer-readable medium of any of claims 23-24, wherein the retrieval was performed by a first user, and the act (E) comprises displaying the results to the first user.

26. The computer-readable medium of claim 20, wherein the previous act was performed by a first user, and the act (E) comprises displaying the results to the first user.

27. The computer-readable medium of claim 19, wherein each of the characteristics of the physical entity corresponding to each result and the previous act by a user with respect to said physical entity are represented by one or more data elements associated with said data entity in the electronic file storage.

28. The computer-readable medium of claim 27, wherein the one or more data elements comply with an XML standard.

29. The computer-readable medium of claim 19, wherein the electronic file storage comprises a database.

30. The computer-readable medium of claim 29, wherein the database further comprises a relational database, the act (B) further comprises creating an SQL query, and the act (C) further comprises executing the SQL query on the relational database.

31. The computer-readable medium of claim 30, wherein the act (D) further comprises arranging the plurality of results into an order defined by at least one instruction provided in the SQL query.

32. The computer-readable medium of claim 19, wherein the act (A) further comprises receiving at least one search criterion from a first user, and the act (E) further comprises displaying results which the first user is authorized to view.

33. The computer-readable medium of claim 32, wherein the act (C) further comprises executing the query against a portion of the electronic file storage comprising data entities which the first user is authorized to view, and wherein the act (E) further comprises displaying results from the execution of the query to the first user.

34. The computer-readable medium of claim 33, wherein the electronic file storage is a database, and the portion of the database comprising data entities which the first user is authorized to view is defined by a database partition.

35. The computer-readable medium of claim 32, wherein the act (E) further comprises executing a programmed procedure to limit the results to those satisfying a predefined condition, so that the only results displayed are those which the first user is authorized to view.

36. The computer-readable medium of claim 19, wherein the characteristic of the physical entity corresponding to each result comprises an interval which has elapsed since a retrieval of the physical entity.

37. The computer-readable medium of claim 19, wherein the characteristic of the physical entity corresponding to each result comprises a quantity of times that the physical entity has been retrieved during an interval.

* * * * *